United States Patent Office 3,455,689
Patented July 15, 1969

3,455,689
PHOTOCHEMICAL CROSS-LINKING OF POLYMERS
Urbain Leopold Laridon and Gerard Albert Delzenne, Wilrijk-Antwerp, Belgium, assignors to Gevaert-Agfa N.V., Mortsel, Belgium, a Belgian company
No Drawing. Filed June 14, 1965, Ser. No. 463,850
Claims priority, application Great Britain, Apr. 13, 1965, 15,811/65
Int. Cl. G03c 1/68
U.S. Cl. 96—35.1    15 Claims

ABSTRACT OF THE DISCLOSURE

The disclosed light-sensitive compositions contain a soluble polymeric material carrying (A) groups that are reactive with intermediates deriving from the photochemical decomposition of azidosulphonyl groups and (B) azidosulphonyl substituents, wherein the soluble polymeric material is obtained by interfacial polycondensation of at least two bi-functional intermediates. Alternatively, these compositions are mixtures of a reactive group-containing polymer and an azidosulphonyl substituent-containing polymer wherein the latter polymer is obtained by interfacial polycondensation of at least two bi-functional intermediates. The preferred bi-functional intermediates are diacid halides, e.g., isophthalyl chloride and/or terephthalyl chloride and/or an azidosulphonyl isophthalyl chloride, and diols such as 2,2-bis(4-hydroxyphenyl)-propane. These light-sensitive compositions are especially suitable for use in recording processes wherein insolubilization of the polymeric material takes place upon exposure to a pattern of actinic light corresponding to the matter to be recorded.

---

The present invention relates to a process for the photochemical insolubilisation of polymers, to a method for the production of printing plates and photographic resists and to printing plates and photographic resists obtained by this process.

In the U.K. patent application No. 24,760/64 a process has been described for the photochemical insolubilisation of polymers, which comprises exposing to actinic light a photosensitive composition consisting essentially of a soluble polymeric material carrying (A) groups that are reactive with intermediates deriving from the photochemical decomposition of azidosulphonyl groups and (B) azidosulphonyl substituents.

As described in the above-mentioned U.K. patent application the polymeric material carrying both reactive groups and azidosulphonyl substituents may be a chemically modified natural polymer or a synthetic polymerisation-, polycondensation- or polyaddition product.

It has now been found that the polycondensation polymers carrying both reactive groups and azidosulphonyl substituents can be very conveniently manufactured by interfacial polycondensation.

The process for one photochemical insolubilisation of polymers in accordance with the invention comprises exposing to actinic light a photosensitive composition consisting at least partially of a soluble polymeric material carrying (A) groups that are reactive with intermediates deriving from the photochemical decomposition of azidosulphonyl groups and (B) azidosulphonyl substituents, said soluble polymeric material being obtained by interfacial polycondensation of at least two bifunctional intermediates.

By interfacial polycondensation reactions can be manufactured polyamides, polyureas, polyurethanes, polysulphonamides, polyesters, polysulphonates and the like.

They can for instance be manufactured by reacting difunctional intermediates such as diamines and diacid halides, diamines and diisocyanates, diamines and dihalocarbonylamino compounds, diamines and dihalocarbonyloxy compounds, diamines and disulphonic acid halides, diols and diacid halides, diols and disulphonic acid halides. These reactions are carried out by use of two immiscible liquid phases, one of which is preferably water. The water phase contains for instance the diamine or diol and any added alkali. The other phase consists for instance of the diacid halides and an organic liquid which is immiscible with the solvent used in the first phase. In a special and most favourable embodiment of the process of the invention the polycondensate to be manufactured is at least partially soluble in the organic liquid used in the second phase. Said organic liquid is preferably an halogenated aliphatic hydrocarbon such as methylene chloride, chloroform, 1,2-dichloroethane, sym.-tetrachloroethane, methylchloroform and 1,1,2-trichloroethane. Other water-immiscible solvents may also be used such as carbon tetrachloride, xylene, hexane, toluene and benzene.

The manufacture of the soluble, light-sensitive polymeric materials by interfacial polycondensation may be performed at low temperatures, even at room temperature.

In any case high melt temperatures are no longer necessary and premature cross-linking of the polymeric material at these high melt temperatures is avoided.

According to a special embodiment of the invention, the groups that are reactive with intermediates deriving from the photochemical decomposition of azidosulphonyl groups are substituted on one polymeric material, whereas the azidosulphonyl substituents themselves are substituted on another polymeric material. In this case the photosensitive composition is constituted by a mixture of both polymeric materials and it is the polymeric material carrying azidosulphonyl substituents that is obtained by interfacial polycondensation.

The photosensitive composition of the invention consists at least partially of the soluble polymeric material carrying reatcive groups and azidosulphonyl substituents, or consists at least partially of a mixture of polymers, one of which carires the reactive groups and the other the azidosulphonyl substituents. Moreover, the photosensitive composition may comprise other polymers, plasicizers, extenders, and the like.

Cross-linking of the soluble polymeric material can be effected to some extent by simply subjecting it to actinic light rays. However, in order to obtain the optimum degree of insolubilization and a faster reaction, it is preferred to effect the reaction in the presence of catalytic amounts of activating dyes. Among these may be mentioned Michler's ketone, and analogues, 4H-quinolizin-4-one, certain naphthothiazolines and pyrazolines, and the like.

The polymeric materials may be exposed to actinic light from any source and of any type. The light source should preferably, although not necessarily, furnish an effective amount of ultraviolet radiation. Suitable sources of light include carbon arcs, mercury vapor lamps, fluorescent lamps, argon glow lamps, photographic flood lamps and tungsten lamps.

For initiating the photochemical cross-linking by means of the azidosulphonyl substituents a very strong light source is not needed. Indeed, in most of the examples described hereinafter, a 80 watt Philips mercury vapor lamp, placed at a distance of about 15 cm. of the surface to be polymerized, is used. Brighter light sources are generally not needed since at these relatively low light intensities the photochemically cross-linking influence of the azidosulphonyl substituents is found to be strong enough.

In the photochemical insolubilization of polymeric materials carrying azidosulphonyl substituents high temperatures are not needed. The exposure, however, to strong light sources at a relatively short distance brings about a certain heating of the mass to be cross-linked, which heating exercises a favourable influence upon the cross-linking rate.

It has been found that the polymeric material carrying azidosulphonyl substituents according to the invention is photosensitive, in the sense that its exposure to light causes its insolubilization. Thus, if a layer of such a photosensitive, initially soluble, polymeric material, is applied to a support and exposed photographically, the exposed areas become insoluble.

The invention is valuable in forming plates and films wholly made of the photosensitive polymeric material. The present process also makes possible the formation of coated printing films on any base by the deposition according to any known process of films or coatings of the photosensitive polymeric material.

The base or support is coated with a solution of the photosensitive polymeric material in a suitable solvent, whereupon the solvent or solvent mixture is eliminated by known means such as evaporation, leaving a more or less thin coating of the photosensitive polymeric material upon the base or support. Thereafter the dried photosensitive coating is exposed to actinic light rays.

If the photosensitive polymeric material is water-soluble water may be used as solvent in coating the support. On the contrary, if photosensitive polymeric materials insoluble in water are used, organic solvents, mixtures of organic solvents or mixtures of organic solvents and water may be used.

The plates formed wholly of or coated with the photosensitive polymeric material are useful in photography, photomechanical reproductions, lithography and intaglio printing. More specific examples of such uses are offset printing, silk screen printing, duplicating pads, manifold stencil sheeting coatings, lithographic plates, relief plates, and gravure plates. The term "printing plates" as used in the calims is inclusive of all of these.

A specific application of the invention is illustrated by a typical preparation of a printing plate. In this application a plate, usually of metal, is coated with a film of the photosensitive composition. When the plate is not of metal it may consist wholly of the photosensitive composition or it may be coated with a layer thereof. In all these cases the surface of the plate is then exposed to light through a contacted process transparency, e.g. a process positive or negative (consisting solely of opaque and transparent areas and where the opaque areas are of the same optical density, the so-called line or half-tone negaitve or positive). The light induces the reaction, which insolubilizes the areas of the surface beneath the transparent portions of the image, whereas the areas beneath the opaque portions of the image remain soluble. The soluble areas of the surface are then removed by a developer, and the insoluble, raised and remaining portions of the film can serve as a resist image, whereas the exposed base material is etched, forming a relief plate, or the plate can be inked and used as a relief printing plate directly in the customary manner.

The photosensitive polymeric materials are also suitable for other purposes than the printing uses described above, e.g. as ornamental plaques or for producing ornamental effects, as patterns for automatic engraving machines, foundry molds, cutting and stamping dies, name stamps, relief maps for braille, as rapid cure coatings, e.g. on film base, as sound tracks on film, for embossing plates, paper, e.g. with a die prepared from the photopolymerizable compositions, in the preparation of printed circuits and of other plastic articles.

The following examples illustrate the present invention.

Example 1

In a flask equipped with a stirrer and a dropping funnel are placed 2.28 g. (0.01 mol) of 2,2-bis(4-hydroxyphenyl)-propane, 20 ccs. of 1 N sodium hydroxide, 0.1 g. of triethylbenzylammonium chloride and 5 ccs. of methylene chloride. The obtained solution is thoroughly stirred and cooled with ice-water, whereupon a solution of 1.015 (0.005 mol) of isophthalyl chloride and 1.54 g. (0.005 mol) of 5-azidosulphonylisophthalyl chloride in 10 ccs. of methylene chloride is added dropwise. The reaction mixture is stirred for another 30 min. Then the aqueous layer is decanted and the remainer is washed with water, diluted with 50 ccs. of methylene chloride and poured into methanol. The precipitatd flaky polymer is collected and dried under reduced pressure. It consists of recurring units of the formulae:

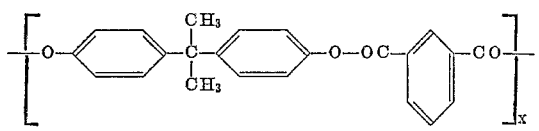

and

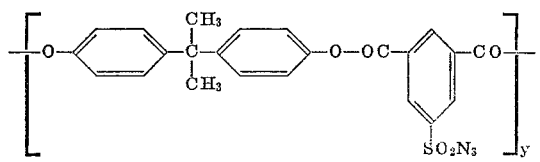

wherein $x$ and $y$ are both equal to 1. This means that the copolyester contains an equal amount of both recurring units.

When in the above described reaction the molar ratio between the acid chlorides is modified, polymers are obtained in which formula the ratio $x/y$ is modified in the same way. E.g., when using 0.0095 mol of isophthalyl chloride and 0.0005 mol of 5-azidosulphonylisophthalyl chloride, a polymer is obtained having the same formula as above, but wherein $x=95$ and $y=5$. In the same way, when using 0.009 mol and 0.0075 mol respectively of isophthalyl chloride as well as 0.001 mol and 0.0025 mol respectively of 5-azidosulphonylisophthalyl chloride, polymers are obtained in which formula $x$ is 90 and 75 and $y$ is 10 and 25 respectively.

Four 0.025 g. samples of the above prepared polymers are each dissolved in a mixture of 2 ccs. of methylene chloride and 1 cc. of sym.-tetrachloroethane and adding to each sample as activator 0.0025 g. of Michler's ketone. The solutions formed are coated onto aluminum foils such that after drying layers of approximately $1\mu$ are obtained. These layers are exposed through a half tone negative by means of an 80 mercury vapour lamp or an ordinary 300 watt lamp placed at a distance of 15 cm. After exposure, the layers are washed with a mixture of equal parts of methylene chloride and sym.-tetrachloroethane, whereby the unexposed parts are washed away and a relief image remains.

The following Table 1 gives the exposure times, which are required to obtain good relief images.

TABLE 1

| Test No. | Ratio $x:y$ | Exposure time required | |
|---|---|---|---|
| | | With U.V.-light | With ordinary light |
| 1 | 95:5 | 60″ | 11′ |
| 2 | 90:10 | 30″ | 5′30″ |
| 3 | 75:25 | 12″ | 2′45″ |
| 4 | 50:50 | 15″ | 2′45″ |

Example 2

In a flask fitted with a stirrer and a dropping funnel are placed 0.77 g. (0.0025 mol) of 5-azidosulphonylisophthalyl chloride, 0.304 g. (0.0015 mol) of isophthalyl chloride, 0.204 g. of pyridine-2,6-dicarboxylic acid chloride (0.001 mol), 10 ccs. of methylene chloride and 0.05 g. of triethylbenzylammonium chloride. While the mixture is stirred and cooled with ice-water, a solution of 1.14 g. of 2,2-bis(4-hydroxyphenyl)-propane (0.005 mol) in 10 ccs. of 1 N sodium hydroxide is added dropwise, whereupon the reaction mixture is stirred for further half an hour. Then the aqueous layer is decanted and the remainder is washed with water, diluted with 50 ccs. of methylene chloride and poured into methanol. The precipitated flaky polymer is collected and dried under reduced pressure. It consists of recurring units of the formulae:

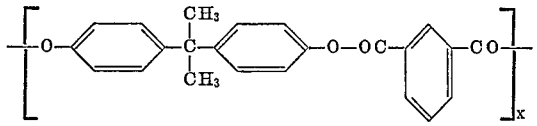

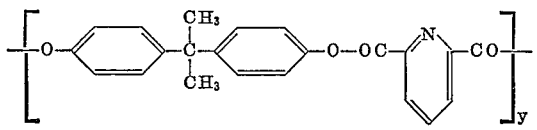

and

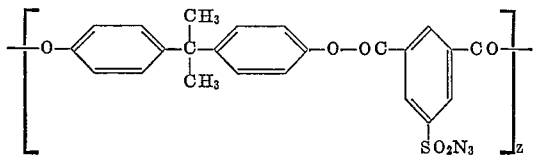

wherein $x=3$, $y=2$, and $z=5$.

Following the method described in the foregoing example, 0.025 g. of the above polymer together with 0.0025 g. of Michler's ketone as activator is dissolved in a mixture of 2 ccs. of methylene chloride and 1 cc. of sym.-tetrachloroethane. This solution is coated onto an aluminium foil. The layer is exposed through a half-tone negative or positive by means of an 80 watt mercury vapour lamp or an ordinary 300 watt lamp at a distance of 15 cm. After washing away the unexposed areas, a relief image remains. For obtaining a good relief image with an 80 watt mercury vapour lamp an exposure of 45″ is needed, whereas with an ordinary 300 watt lamp an exposure time of 7′30″ is required.

Example 3

The polycondensation method described in Example 2 is repeated with the sole difference that the mixture of isophthalyl chloride, 5-azidosulphonyl isophthalyl chloride and of pyridine-2,6-dicarboxylic acid chloride is replaced by 1.54 g. of 5-azidosulphonylisophthalyl chloride (0.005 mol). A polymer is obtained which is composed of repeating units of the formula

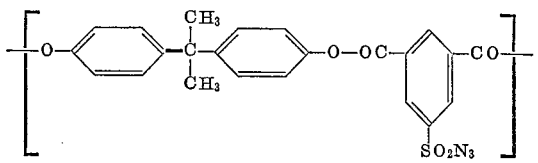

After coating a solution of this polymer on an aluminium foil as in Example 1 and exposing the layer obtained through a line negative or positive with an 80 watt mercury vapour lamp or with an ordinary 300 watt lamp at a distance of 15 cm., the unexposed areas may be washed away. In order to obtain a good relief image with the mercury vapour lamp an exposure time of 45″ is needed, whereas with the ordinary 300 watt lamp an exposure time of 5′30″ is required.

Example 4

In a flask equipped with a stirrer and a dropping funnel are placed 2.28 g. (0.01 mol) of 2,2-bis(4-hydroxyphenyl)-propane, 20 ccs. of 1 N sodium hydroxide, 0.1 g. of triethylbenzylammonium chloride and 5 ccs. of methylene chloride. The solution is thoroughly stirred and cooled with ice-water, while a solution of 0.77 g. (0.0025 mol) of 5-azidosulphonylisophthalyl chloride, 0.7605 g. (0.00375 mol) of terephthalyl chloride, 0.7605 g. (0.00375 mol) of isophthalyl chloride and 10 ccs. of methylene chloride are added dropwise. Then the same procedure of Example 1 is followed. The obtained polymer is composed of recurring units of the following formulae.

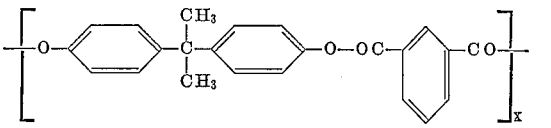

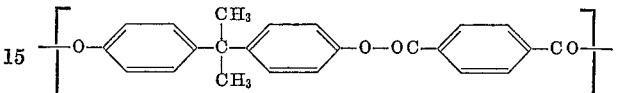

and

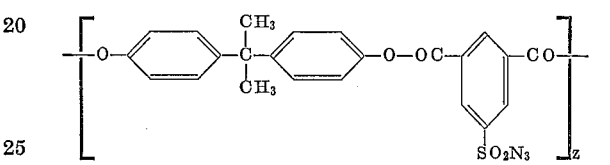

wherein $x=37.5$, $y=37.5$, and $z=25$.

By modifying the respective amounts of isophthalyl chloride, terephthalyl chloride and 5-azidosulphonylisophthalyl chloride, polymers are obtained having corresponding amounts $x$, $y$ and $z$ of recurring units. As described in Example 1, these polymers are dissolved and applied to an aluminium foil. As described in that same example, the coated layer of polymer is exposed through a line negative and freed from its non-exposed parts by washing away. As ultraviolet light source an 80 watt mercury vapour lamp and as ordinary light source a common 300 watt lamp are used. The required exposure times for obtaining good relief images are listed in Table 2.

TABLE 2

| Test No. | Ratio $x$:$y$:$z$ | Exposure time required | |
|---|---|---|---|
| | | With U.V.-light | With ordinary light |
| 1 | 37.5:37.5:25 | 15″ | 2′45″ |
| 2 | 47.5:47.5:5 | 60″ | 11′ |
| 3 | 46.25:46.25:7.5 | 90″ | 11′ |
| 4 | 45:45:10 | 30″ | 3′45″ |

We claim:
1. Process for the photochemical insolubilization of polymers by exposing to actinic light a photo-sensitive composition comprising a soluble polymeric material carrying (A) groups that are reactive with intermediates derived from the photochemical decomposition of azidosulphonyl groups and (B) azidosulphonyl substituents, wherein said soluble polymeric material is obtained by interfacial polycondensation of difunctional intermediates selected from the group consisting of diamines and diacid halides; diamines and diisocyanates; diamines and dihalocarbonylamino compounds; diamines and dihalocarbonyloxy compounds; diamines and disulphonic acid halides; diols and diacid halides, and diols and disulphonic acid halides.

2. Process for the photochemical insolubilization of polymers by exposing to actinic light a photo-sensitive composition comprising a mixture of (A) a soluble polymeric material carrying groups that are reactive with intermediates derived from the photochemical decomposition of azidosulphonyl groups and of (B) a soluble polymeric material carrying azidosulphonyl substituents, wherein said soluble polymeric material carrying azidosulphonyl substituents is obtained by interfacial polycondensation of difunctional intermediates selected from the group consisting of diamines and diacid halides;

diamines and diisocyanates; diamines and dihalocarbonylamino compounds; diamines and dihalocarbonyloxy compounds; diamines and disulphonic acid halides; diols and diacid halides, and diols and disulphonic acid halides.

3. Process for the photochemical insolubilization of polymers by exposing to actinic light a photosensitive composition comprising a soluble polymeric material carrying (A) groups that are reactive with intermediates derived from the photochemical decomposition of azidosulphonyl groups, and (B) azidosulphonyl substituents, wherein said soluble polymeric material is obtained by interfacial polycondensation of a diol and a polyester-forming difunctional intermediate reactive therewith.

4. Process for the photochemical insolubilization of polymers by exposing to actinic light a photosensitive composition comprising a mixture of (A) a soluble polymeric material carrying groups that are reactive with intermediates derived from the photochemical decomposition of azidosulphonyl groups and of (B) a soluble polymeric material carrying azidosulphonyl substituents, wherein said soluble polymeric material carrying azidosulphonyl substituents is obtained by interfacial polycondensation of a diol and a polyester-forming difunctional intermediate reactive therewith.

5. Process according to claim 3 wherein the interfacial polycondensation is carried out by use of two immiscible liquid phases, each phase containing at least one of the intermediates in the dissolved state.

6. Process according to claim 5 wherein the polycondensate to be formed is at least to some extent soluble in one of the two immiscible solvents.

7. Process according to claim 5 wherein one of the immiscible solvents is water, the other being an halogenated aliphatic hydrocarbon of the group consisting of methylene chloride, chloroform, 1,2-dichloroethane, sym.-tetrachloroethane, methylchloroform, and 1,1,2-trichloroethane.

8. Process according to claim 3 wherein a diol and an alkali are dissolved in water, and reacted with a diacid halide dissolved in a halogenated aliphatic hydrocarbon in which the polyester to be formed is at least to some extent soluble.

9. Process according to claim 8 wherein the diol is 2,2-bis(4-hydroxyphenyl)-propane and the diacid halide is 5-azidosulphonylisophthalyl chloride.

10. Process according to claim 8 wherein the diol is 2,2-bis(4-hydroxyphenyl)-propane and the diacid halide is a mixture of isophthalyl chloride and 5-azidosulphonylisophthalyl chloride.

11. Process according to claim 8 wherein the diol is 2,2-bis(4-hydroxyphenyl)-propane and the diacid halide is a mixture of isophthalyl chloride, pyridine-2,6-dicarboxylic acid chloride and 5-azidosulphonylisophthalyl chloride.

12. Process according to claim 8 wherein the diol is 2,2-bis(4-hydroxyphenyl)-propane and the diacid halide is a mixture of isophthalyl chloride, terephthalyl chloride and 5-azidosulphonylisophthalyl chloride.

13. Light-sensitive compositions comprising polymeric materials selected from the group consisting of
(1) a soluble polymeric material carrying (A) groups that are reactive with intermediates deriving from the photochemical decomposition of azidosulphonyl groups, and (B) azidosulphonyl substituents, wherein said soluble polymeric material is the reaction product of the interfacial polycondensation of a diol and a polyester-forming difunctional intermediate reactive therewith, and
(2) a mixture of (A) a soluble polymeric material carrying groups that are reactive with the intermediates deriving from the photochemical decomposition of azidosulphonyl groups and (B) a soluble polymeric material carrying azidosulphonyl substituents, wherein said soluble polymeric material carrying azidosulphonyl substituents is the reaction product of the interfacial polycondensation of a diol and a polyester-forming difunctional intermediate reactive therewith and an activator.

14. The light-sensitive compostion according to claim 13 wherein the said polymeric material is the reaction product of a diol and a diacid halide and wherein the diol and an alkali are dissolved in water and reacted with the diacid halide dissolved in a halogenated aliphatic hydrocarbon in which the polyester to be formed is at least to some extent soluble.

15. A recording process wherein a recording material consisting of or including a layer comprising a light-sensitive composition according to claim 13 is exposed to a pattern of actinic light representing matter to be recorded, so that over the areas of said layer differential insolubilization takes place.

References Cited

UNITED STATES PATENTS

| 2,948,610 | 8/1960 | Merrill et al. | 96—33 |
| 3,058,944 | 10/1962 | Breslow et al. | 260—41 |
| 3,143,423 | 8/1964 | Reynolds et al. | 96—91 |
| 3,203,936 | 8/1965 | Breslow et al. | 260—79.3 |
| 3,261,785 | 7/1966 | Robinson | 260—2.5 |
| 3,278,305 | 10/1966 | Laridon et al. | 96—35.1 |
| 3,301,841 | 1/1967 | Burleigh et al. | 260—94.4 |
| 3,345,171 | 10/1967 | Laridon et al. | 96—36 |

NORMAN G. TORCHIN, Primary Examiner

R. H. SMITH, Assistant Examiner

U.S. Cl. X.R.

96—91, 115; 204—159.19; 260—79.3, 349